April 22, 1958  L. W. SEIFRIED  2,831,427
ADDRESS PLATE AND CARRIER
Filed Oct. 12, 1955  2 Sheets-Sheet 1

INVENTOR.
LYLE W. SEIFRIED
BY Wallace and Cannon
ATTORNEYS

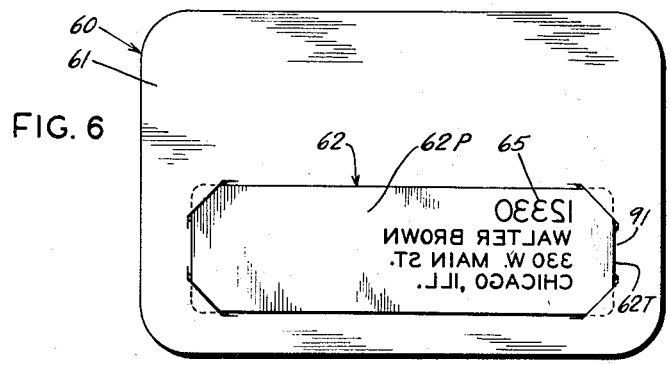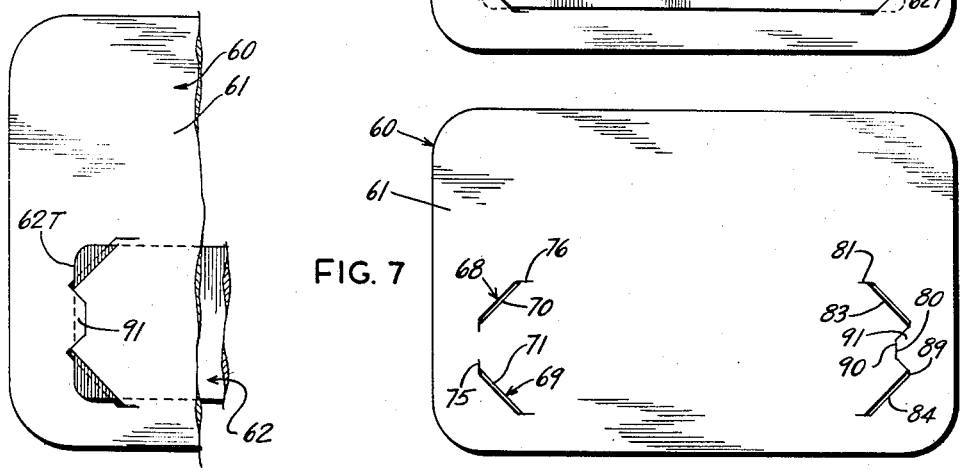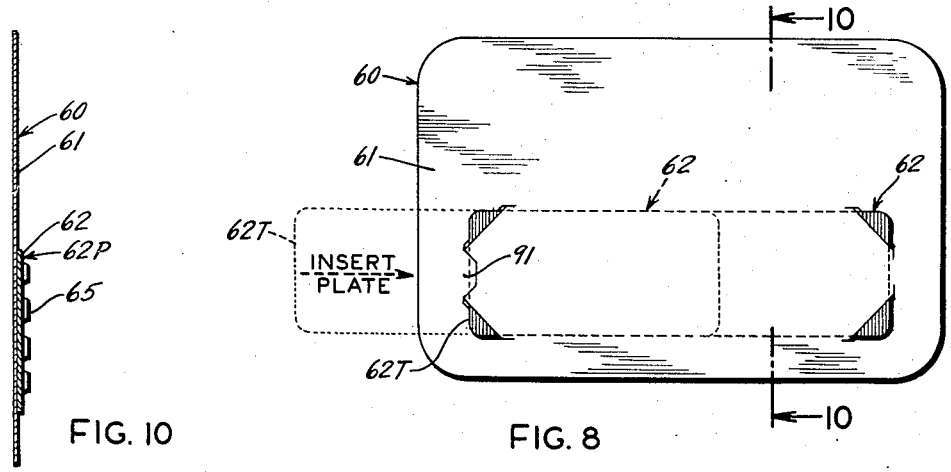

United States Patent Office 2,831,427
Patented Apr. 22, 1958

2,831,427

ADDRESS PLATE AND CARRIER

Lyle W. Seifried, Euclid, Ohio, assignor to Addressograph-Multigraph Corporation, Cleveland, Ohio, a corporation of Delaware Application October 12, 1955, Serial No. 539,971

7 Claims. (Cl. 101—369)

This invention relates to printing devices, and in particular to printing devices in the form of a card, sheet or like carrier having removably associated therewith a printing plate such as printing plate embossed with permanent or fixed data in the form of an address, social security number, customer code number, or the like to be used for imprinting such data on a sheet, notice or the like.

Commercial transactions that involve the periodic mailing of accounting notices such as bank statements, department store credit statements and the like are expeditiously and accurately conducted by business devices in the form of a ledger or record card having associated therewith a printing plate embossed with the name, address and other pertinent data of the person to whom such statements are to be mailed, and additional space is provided on the ledger or record card for the entering of accounting data. These devices for doing business can be arranged in a predetermined order in files at the bookkeeping department, and when activated the printing plate on the device bearing embossures is used for addressing or printing the notice to be mailed thereby assuring accuracy in this respect. United States Patent Nos. 2,633,079 and 2,633,080 are exemplary of printing devices of this kind.

Another kind of printing device that includes a removable printing plate is the so-called credit card that has attained wide use in credit transactions among department store merchandisers, oil companies, and the airlines. The printing plate in this instance is again embossed with fixed data and is removably associated with a card of plastic, heavy card stock, or like material usually printed with contract or agreement data setting forth the contractual credit relations involved, these being issued to accredited persons and usually validated for a certain time. When a credit transaction is conducted with a device of this kind, the credit card is surrendered and is thereupon arranged in a printing machine so as to imprint the name and address of the customer on the sales slip bearing a tabulation of the credit purchase, such again insuring accuracy of the record. Printing devices of this kind are exemplified by United States Patent Nos. 2,305,127, 2,305,195, and 2,693,756.

In each of the foregoing printing device embodiments, it is desirable that the printing plate, of whatever specific form, be removably associated with the card or so-called carrier for several reasons, and among these reasons are to accommodate a new plate for a change in address, code or the like or to accommodate a periodic re-validation of the customer credit privilege. The primary object of the present invention is to materially simplify the way in which the printing plate is thus to be removably associated with the carrier, and as used herein the term carrier is comprehensive of the member, usually of temporary nature, as distinguished from the printing plate which is usually of durable metal, plastic or the like having permanent or fixed data, to which the printing plate is removably attached, whether such carrier be in the form of a relatively large somewhat stiff ledger sheet, a relatively small wallet-sized card, or other such member used for business purposes.

A further object of the present invention is to enable printing devices of the foregoing kind to be so constructed as to be capable of including a printing plate that need not be provided with struck up lugs, openings or the like formed therein as intended to cooperate with retaining means of special form provided on the carrier or the like as part of the device.

Other and further objects of the present invention will be apparent from the following description and claims and are illustrated in the accompanying drawings which, by way of illustration, show preferred embodiments of the present invention and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

In the drawings:

Fig. 6 is a front plan view of a modified form of the present invention further illustrated as embodied in a credit card printing device;

Fig. 7 is a plan view of the card portion of the device as shown in Fig. 6 with the printing plate removed;

Fig. 8 is a rear plan view similar to Fig. 6;

Fig. 9 is a fragmentary view at one end of the credit card printing device; and

Fig. 10 is a sectional view taken on the line 10—10 of Fig. 8.

Figure 1:
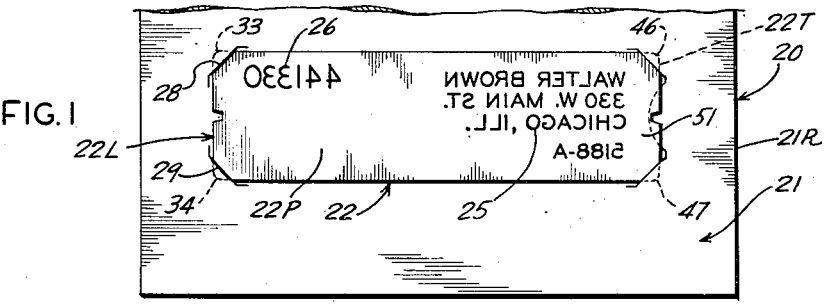
Fig. 1 is a fragment of a carrier bearing an associated printing plate in accordance with the present invention, being a front plan view.

The present invention in one form is illustrated in Figs. 1 through 5 as embodied in a printing device 20, Fig. 1, which includes a carrier 21 and a printing plate 22 removably mounted thereon in a way to be explained below. The carrier 21 in this instance is a ledger sheet or the like which is adapted in the portion (not shown) beyond the printing plate 22 for the entry of commercial data, and printing devices as 20 are stored in a drawer or other file in predetermined order for purposes well understood in the art as explained in detail in Patent Nos. 2,633,079 and 2,633,080. Data pertaining to the account are periodically entered on the sheet 21, and at certain periods these are checked and notices prepared from such data are mailed out.

The printing plate 22 is of the embossed kind, being provided with embossed data 25 which in the present instance are represented by the address of the person to whom printing device 20 pertains. In addition to the data 25, the plate 22 may also be embossed in another area with data as 26 in the form on an account number, code designation, or the like. The data 25 and 26, as these appear in Fig. 1, project outwardly from the plate 22 in relief form so that the side of the printing plate appearing in Fig. 1 is the printing side 22P. On the opposite side of the plate 22, the data 25 and 26 appear as intaglio depressions and these are direct reading in contrast to the relief side 22P of the plate 22. Thus, the data 25 and 26 in relief are adapted to imprint the accounting notice that is to be mailed with the address of the person who is to receive the notice. The plate 22 may be of embossable metal, plastic or the like, and printing plates other than the embossed kind may of course be used.

Under the present invention, the printing plate 22 is retained against lateral displacement on the carrier 21 in part by a flap portion of the carrier adapted to engage an end edge of the plate, and when it is desired to remove the plate this flap is flexed to be out of the way of the plate.

Figure 2:
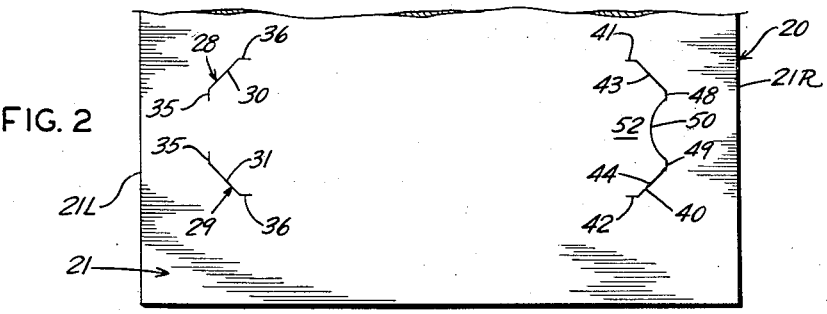
Fig. 2 is a fragment of the carrier as shown in Fig. 1 but with the printing plate removed.

As shown in Fig. 2, the carrier 21 is provided at one side 21L with plate holding means in the form of a pair of slits 28 and 29 that respectively include intermediate portions 30 and 31. The slits 30 and 31 are slanted relative to the side edge 21L of the carrier to afford angled retainer pockets for the upper and lower corners 33 and 34, Fig. 1, of the plate 22 at the end thereof corresponding to the side edge 21L of the carrier 21. At their inner or adjacent ends, the portions 30 and 31 of the slits 28 and 29 are provided with extensions as 35 that are parallel to the edge 21L of the carrier 21, these serving as stops for the corresponding end of the plate 22 as will be observed in Fig. 1. The retainer slits 28 and 29 are also provided with extensions as 36 which extend at right angles to the extensions 35, thereby affording abutments for engaging portions of the upper and lower edges of the plate 22 to hold the plate aligned on the carrier. The carrier 21 is of plastic, card stock or like material, and it will be recognized that the extensions 35 and 36 of the plate mounting slits prevent undue dog-earing or tearing of the carrier by the end edge of the plate 22.

Figure 5A:
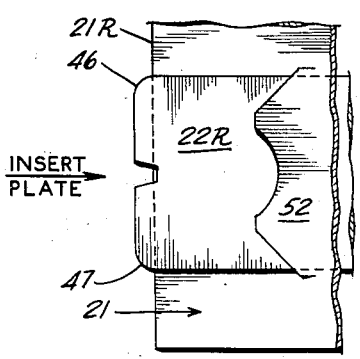
Fig. 5A is a fragmentary rear plan view on an enlarged scale showing the relation of the printing plate to the carrier preliminary to association of the printing plate with the carrier.
Figure 5B:
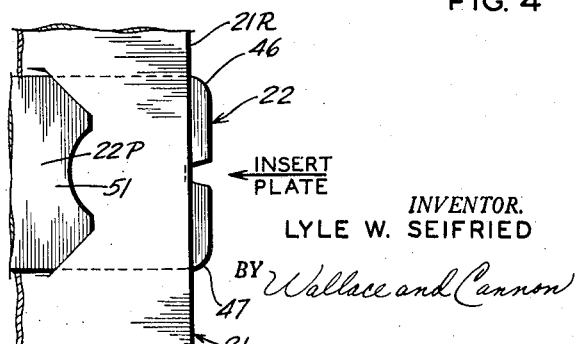
Fig. 5B is a front plant view corresponding to Fig. 5A.

Adjacent the edge of the carrier 21R that is opposite the edge 21L is a slit 40 defined in the following manner: relatively short upper and lower portions 41 and 42, Fig. 2, that correspond to the extensions 36 of the slits at the opposite side of the carrier; long slits 43 and 44 extending from the slit portions 41 and 42 outwardly in converging relation toward the side edge 21R of the carrier 21, these slits 43 and 44 corresponding to the slit portion 30 and 31 mentioned above and thereby affording pockets for the opposite upper and lower corners 46 and 47, Fig. 1 of the plate 22; relatively short slit portions 48 and 49 at ends of the slits 43 and 44, the slits 48 and 49 corresponding to the slit portions 35 mentioned above; and an inwardly bowed arcuate slit 50 which connects the short slit portions 48 and 49 and which affords a flexible flap 51, Figs. 3 and 5B, integral with the carrier 21.

Figure 3:
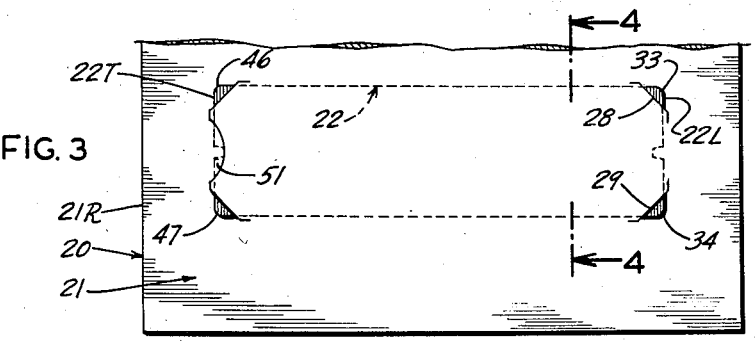
Fig. 3 is a rear plan view of the card and associated printing plate as shown in Fig. 1.
Figure 4:
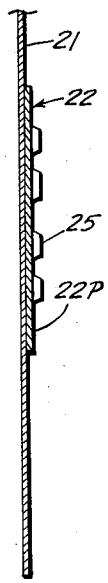
Fig. 4 is a sectional view taken substantially on the line 4—4 of Fig. 3.

To associate the plate 22 with the carrier 21 in the relation shown in Figs. 1 and 3, the card 21 is held in one hand in the position shown in Fig. 2, and the plate 22 is held in the other hand with the printing side 22P disposed upwardly, that is, as viewed in Fig. 1. The leading end 22L of the plate 22, that is, the end corresponding to the corners 33 and 34 mentioned above, is then passed through the opening in the carrier afforded by the slit 40 so that the flap 51 overlays the printing side 22P of the plate 22. In this connection, it will be recognized that the flap 51 has a counter-part 52, Figs. 2 and 5A, complemental to the flap 51, and at the time the flap 51 overlays the side 22P of the plate 22 as mentioned above the counter-part 52 of the flap 51 overlays the opposite side of the plate 22R as shown in Fig. 5A.

Subsequent to disposing the flap 51 and its counter-part 52 on opposite sides of the plate 22, the plate 22 is then advanced along the carrier 21 to the left as viewed in Fig. 2 until the corner portions 33 and 34 thereof pass into the openings afforded by the slits 30 and 31, the stop portions 35 serving to limit such initial positioning of the plate 22. It will then be found that the corner portions 46 and 47 of the plate 22 at the opposite or trailing end 22T, Figs. 1 and 3, are disposed in the openings in the carrier afforded by the slits 43 and 44. At this stage, the plate may still be withdrawn back through the slit 40, but to secure the plate in position it is merely necessary to flex or depress the flap 51 past the trailing edge 22T of the initially positioned plate 22 so that the flap 51 overlays slightly the end portion of the plate 22 on the reverse or non-printing side 22R thereof as shown in Fig. 1. Such reversal of the flap 51 disposes the flap 51 and the counter-part 52 in complemental relation as shown in Fig. 3, thereby closing off the slit 40 through which the plate was initially passed. This completes association of the plate 22 and the carrier 21, and the plate 22 is held securely in place against lateral displacement in either direction inasmuch as by depressing the flap 51 as above described such disposed a solid portion of the carrier in engagement with the end edge 22T of the plate in the portion of the plate intermediate the slits 43 and 44.

The present invention may be used to advantage in so-called credit cards of the kind used for credit transactions, and this form of the invention is illustrated in Figs. 6 through 10 as embodied in a credit card 60 substantially of wallet size. The credit card 60 includes a carrier 61 and also a printing plate 62. The printing plate 62 is similar to the plate 22 described above, and thus is embossed with data 65 used for imprinting in the usual way, the data 65 appearing in relief form on the printing side 62P, Fig. 6, of the plate 62.

The area of the carrier 61 that is beyond the plate 62 is adapted to be printed with a statement setting forth the various outlets for the credit card 60, the controlling terms of the agreement, the period for which the credit instrument is valid and so on.

In most respects the means for releasably securing the printing plate 62 to the carrier 61 are identical to what was described above. Thus, the carrier 61 at one side is provided with slits 68 and 69, and in this instance the slanted portions 70 and 71 thereof are enlarged to facilitate entry of the corresponding corner portions of the plate 62 therein, and it will also be observed that the slits 68 and 69 are provided with extensions 75 and 76 which respectively serve the purpose of the slit extensions 35 and 36 described above.

At the opposite side of the carrier 61 there is a slit 80 generally like the slit 40 described above, thus including short extensions 81 that are aligned with the slit extensions 76 on the opposite side of the card, enlarged slits 83 and 84 which converge as these progress outwardly toward the side edge of the carrier 61, extensions as 89 serving as stops and an intermediate slit 90 which connects the extensions 89.

It will be observed that the slit 90 follows a trapezoidal outline thereby affording a relatively short and blunt flap 91, Fig. 9, and a complemental counter-part inwardly thereof. When the plate 62 and carrier 61 are to be associated, the carrier is held in the position corresponding to Fig. 7 whereupon the plate 62 is passed through slit 80 with the flap 90 disposed on the upper or printing side of the plate 62P and the counter-part of the flap disposed on the opposite side of the plate 62. The plate 62 is then advanced along the carrier 61 until the corners at the leading end thereof pass into the slits 70 and 71 and engage the stop slits 75. The opposite corners of the plate 62 then repose in the slits 83 and 84, whereupon the flap 91 is pressed downwardly past the trailing end 62T of the plate 62 to re-mate with the counter-part of the flap 91 on the opposite or non-printing side of the plate as shown in Figs. 8 and 9.

It will be seen from the foregoing that under the present invention the printing plate need not be specially constructed with lugs, openings or the like formed therein that are adapted to cooperate with complemental means on the carrier to hold the plate to the carrier. Thus, in accordance with the present invention, the carrier part of the device is provided with openings in the form of slits affording retaining pockets or hold-down ears for the corners of the plate, the plate being held in position against lateral displacement by a depressible flap formed in the carrier adapted to engage an end edge of the plate.

Hence, while I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

I claim:

1. A printing device of the kind described comprising a carrier and a printing plate, said carrier including slits formed therein to receive and hold down on the carrier corners of the plate at one end thereof, other slits in the carrier spaced from the first-named slits and adapted to receive and hold down on the carrier corners of the plate at the other end thereof, said other slits being connected by a slit affording a flap in the carrier which when flexed outwardly of the carrier enables said printing plate to be passed therebeneath and along the face of the carrier until the first-named corners thereof repose in the first-named slits with the second-named corners of the plate reposed in the second-named slits and with said flap overlapping slightly a portion of the face of the plate, said flap being then adapted to be depressed or flexed in the opposite direction to overlay the opposite face of the plate and engage the end edge of the printing plate corresponding thereto to hold the printing plate on the carrier against shifting movement past said flap.

2. A printing device of the kind described comprising a carrier and an associated printing plate, said carrier including slits formed therein affording pockets in which are disposed corners of the printing plate at one end thereof, other slits in the carrier spaced from the first-named slits and affording other pockets in which are disposed corners of the plate at the other end thereof, said other slits being connected by a slit affording a flap between said other pockets which are opened outwardly with respect to the carrier to enable said printing plate to be passed therethrough and along the face of the carrier until the first-named corners thereof reposed in the first-named pockets as aforesaid with the second-named corners of the printing plate reposed in the first-named pockets as aforesaid and with said flap overlapping slightly a portion of a face of the printing plate, said flap having been depressed or flexed to normally overlay the opposite face of the printing plate and engage the end edge of the printing plate corresponding to the second-named pockets.

3. A printing device carrier of the kind described, and including slits affording pockets to releasably hold down on the carrier corners at one end portion of a printing plate, other slits in the carrier affording other pockets to hold down on the carrier corners at the opposite end portion of the printing plate, and a flap on the carrier being defined by a slit in the carrier interconnecting the slits affording said other pockets, said flap being positioned so that when the printing plate has been disposed on the carrier with the corners thereof disposed in said pockets said flap overlays a portion of a face of the printing plate adjacent the end thereof and is adapted to thereupon be flexed to overlay a portion of the opposite face of the printing plate and engage the corresponding end edge of the printing plate to prevent shifting of the printing plate on the carrier past said flap.

4. A printing device of the kind described comprising in assembled relation: a carrier and a printing plate, said carrier including means thereon to releasably hold down on the carrier one end of the printing plate, spaced slits on the carrier spaced from the first-named means and affording pockets to hold down on the carrier corners of the printing plate at the other end thereof, and a flexible flap on the carrier defined by a slit in the carrier where an end edge portion of the printing plate corresponding to said corners is normally disposed, the slit affording said flap being extended to and between the first-named spaced slits to enable the plate to be passed therethrough and disposed along a face of the carrier, said flap being positioned so that when the printing plate has been disposed as aforesaid with the one end thereof releasably held as aforesaid said flap overlays a portion of a face of the plate adjacent said other end thereof and is adapted to thereupon be flexed to overlay a portion of the opposite face of the plate and engage the related end edge of the plate to hold the printing plate against shifting movement past said flap.

5. A printing device carrier of the kind described, including means thereon to releasably hold down on the carrier one end of a printing plate, a pair of slits on the carrier spaced from the first-named means and affording pockets for and adapted to hold down on the carrier the corners at the other end of the plate, and a flexible flap on the carrier being defined by a slit in the carrier extended to and between and connecting the pair of slits, said flap being positioned so that when the plate has been disposed on the carrier with said corners thereof at said one end of the plate engaged with the holding means therefor and with the corners at said other end of the plate disposed in said pockets therefor, said flap overlays a face of the plate adjacent said other end portion thereof and is adapted to thereupon be flexed to overlay the opposite face of the plate and engage the related end edge of the printing plate to prevent shifting of the printing plate on the carrier past said flap.

6. A printing device of the kind described comprising, in assembled relation: a one-piece carrier of flexible sheet material and an associated printing plate, said carrier including means to releasably hold down on the carrier one end of the printing plate, and a flexible flap formed on said carrier afforded by a slit therein and adapted to be flexed in one direction outwardly away from the plane of said carrier to admit the printing plate through the resultant opening in the carrier to dispose the printing plate as aforesaid in association with the printing plate holding means, a pair of other slits extending from the ends of the first-named slit at an angle thereto and affording pockets for the two corners at the other end of the plate, said flap being positioned so that when the printing plate has been disposed as aforesaid and with said two corners thereof reposed in said pockets said flap overlays a portion of a face of said printing plate at the end thereof corresponding to said corners and is adapted to thereupon be flexed to overlay a portion of the opposite face of said printing plate to engage solidly the corresponding end edge of the printing plate inwardly of said two corners of the plate to hold the plate against shifting on the carrier past said flap.

7. A printing device carrier for a printing plate of the kind described, and including means thereon with which a portion of the printing plate at one end is adapted to be slidably engaged to releasably hold said one end of the printing plate on the carrier, spaced angled slits in the carrier affording pockets in which the corners of the printing plate at the other end are slidably fittable, and a flexible flap on the carrier defined by a slit in the carrier joining portions of the first-named slits, said flap being of a length such that by flexing the flap outwardly to disclose an opening in the carrier the printing plate may be passed through such opening and disposed on the carrier to engage said first-named holding means and have said corners thereof disposed in said pockets, and said flap being positioned so that when the printing plate has been disposed on the carrier as aforesaid said flap overlays a portion of a face of said printing plate at the end thereof adjacent said corners of the plate and is adapted to thereupon be flexed to overlay a portion of the opposite face of said printing plate and be disposed in solid abutting relation to the corresponding end edge of the printing plate to prevent endwise shifting movement of the plate past said flap.

References Cited in the file of this patent

UNITED STATES PATENTS

| | | |
|---|---|---|
| 1,381,674 | Simpson | June 14, 1921 |
| 1,474,174 | Segall | Nov. 13, 1923 |
| 1,544,139 | Duclos | June 30, 1925 |
| 1,818,830 | Van Dusen | Aug. 11, 1931 |
| 2,518,535 | Farrington | Aug. 15, 1950 |
| 2,557,652 | Gollwitzer | June 19, 1951 |